United States Patent [19]

Moffatt et al.

[11] Patent Number: 5,489,558

[45] Date of Patent: Feb. 6, 1996

[54] GLASSES FOR FLAT PANEL DISPLAY

[75] Inventors: Dawne M. Moffatt, Corning; Dean V. Neubauer, Horseheads, both of N.Y.

[73] Assignee: Corning Incorporated, Corning, N.Y.

[21] Appl. No.: 445,566

[22] Filed: Apr. 24, 1995

Related U.S. Application Data

[63] Continuation of Ser. No. 212,060, Mar. 14, 1994, abandoned.

[51] Int. Cl.$^6$ .................................................... C03C 3/085
[52] U.S. Cl. ................................ 501/69; 501/70; 501/66; 65/99.2
[58] Field of Search .............................. 501/69, 70, 66; 65/90, 99.2

[56] References Cited

U.S. PATENT DOCUMENTS

| | | |
|---|---|---|
| 3,496,401 | 2/1970 | Dumbaugh, Jr. . |
| 3,978,362 | 8/1976 | Dumbaugh, Jr. et al. . |
| 4,060,423 | 11/1977 | Thomas . |
| 4,180,618 | 12/1979 | Alpha et al. . |
| 4,255,198 | 3/1981 | Danielson et al. . |
| 4,302,250 | 11/1981 | Danielson . |
| 4,394,453 | 7/1983 | Dambaugh, Jr. . |
| 4,409,337 | 10/1983 | Dumbaugh, Jr. . |
| 4,441,051 | 4/1984 | Thomas . |
| 4,634,683 | 1/1987 | Dumbaugh, Jr. . |
| 4,634,684 | 1/1987 | Dumbaugh, Jr. . |
| 4,824,808 | 4/1989 | Dumbaugh, Jr. . |
| 5,116,787 | 5/1992 | Dumbaugh, Jr. . |
| 5,116,788 | 5/1992 | Dumbaugh, Jr. . |
| 5,116,789 | 5/1992 | Dumbaugh, Jr. et al. . |

FOREIGN PATENT DOCUMENTS 4-160030  6/1992  Japan .

*Primary Examiner*—Karl Group
*Attorney, Agent, or Firm*—Robert L. Carlson; Milton M. Peterson

[57] ABSTRACT

A barium aluminosilicate glass for production of a panel in an LCD device and a method of producing the panel. The glass consists essentially of, as calculated in percent by weight on an oxide basis, 50–65% $SiO_2$, at least 8% $Al_2O_3$, the $Al_2O_3$ being 8–13% in conjunction with 55–65% $SiO_2$ and 18–22% in conjunction with 50–55% $SiO_2$, $SiO_2+Al_2O_3>68\%$, 0–8% $B_2O_3$, 2–21% BaO, 0–13% SrO, 0–18% CaO, 0–6% MgO and 13–30% BaO+CaO+SrO+MgO.

10 Claims, No Drawings

GLASSES FOR FLAT PANEL DISPLAY

This is a continuation of Ser. No. 08/212,060, filed Mar. 14, 1994, now abandoned.

FIELD OF THE INVENTION

Alkali-free, barium aluminosilicate glasses exhibiting physical and chemical properties necessary for substrates in flat panel display devices and for production by a process other than overflow downdraw sheet forming.

BACKGROUND OF THE INVENTION

Liquid crystal displays (LCDs) are flat panel display devices which depend upon external sources of light for illumination. They may take one of two basic matrix types, intrinsic or extrinsic matrix addressed. The intrinsic matrix type relies upon the threshold properties of the liquid crystal material. The extrinsic, or active matrix (AM), type has an array of diodes, metal-insulator-metal (MIM) devices, or thin film transistors (TFTs), that supplies an electronic switch to each pixel.

In both cases, two sheets of glass form the structure of the display. The separation between the two sheets is the critical gap dimension, of the order of 5–10 μm. The glass sheets must be transparent, and must withstand the chemical conditions to which they are exposed during display processing. Otherwise, the needs of the two matrix types differ.

Intrinsically addressed LCDs are fabricated using thin film deposition techniques at temperatures ≦350° C., followed by photolithographic patterning. As a result, the substrate requirements therefore are often the same as those for segmented displays. Soda-lime-silica glass with a barrier layer has proven to be adequate for most needs.

A high performance version of intrinsically addressed LCDs, the super twisted nematic (STN) type, has an added requirement of extremely precise flatness for the purpose of holding the gap dimensions uniform. Because of that requirement, soda-lime-silica glass used for those displays must be polished. Alternatively, a precision formed, barium aluminoborosilicate glass, marketed by Corning Incorporated, Corning, N.Y. as Code 7059, may be used without polishing.

Extrinsically addressed LCDs can be further subdivided into two categories; viz., one based on MIM or amorphous silicon (a-Si) devices, and the other based on polycrystalline silicon (poly-Si) devices. The substrate requirements of the MIM or a-Si type are similar to the STN application. Corning Code 7059 sheet glass is the preferred substrate because of its very low sodium content, i.e., less than 0.1% $Na_2O$ by weight, its dimensional precision, and its commercial availability.

Devices formed from poly-Si, however, are processed at higher temperatures than those that are employed with a-Si TFTs. Substrates capable of use temperatures (taken to be 25° C. below the strain point of the glass) of 600°–800° C. are demanded. The actual temperature required is mandated by the particular process utilized in fabricating the TFTs. Those TFTs with deposited gate dielectrics require 600°–650° C., while those with thermal oxides call for about 800° C.

Both a-Si and poly-Si processes demand precise alignment of successive photolithographic patterns, thereby necessitating that the thermal shrinkage of the substrate be kept low. Those temperatures have mandated the use of glasses exhibiting higher strain points than soda-lime-silica glass and Corning Code 7059 glass in order to avoid thermal deformation of the sheet during processing. As can be appreciated, the lower the strain point, the greater this dimensional change. Thus, there has been considerable research to develop glasses demonstrating high strain points so that thermal deformation is minimized during device processing at temperatures greater than 600° C., and preferably, higher than 650° C.

U.S. Pat. No. 4,824,808 (Dumbaugh, Jr.) lists four properties which have been deemed mandatory for a glass to exhibit in order to fully satisfy the needs of a substrate for LCDs:

First, the glass must be essentially free of intentionally added alkali metal oxide to avoid the possibility that alkali metal from the substrate can migrate into the transistor matrix;

Second, the glass substrate must be sufficiently chemically durable to withstand the reagents used in the TFT matrix deposition process;

Third, the expansion mismatch between the glass and the silicon present in the TFT array must be maintained at a relatively low level even as processing temperatures for the substrates increase; and Fourth, the glass must be capable of being produced in high quality thin sheet form at low cost; that is, it must not require extensive grinding and polishing to secure the necessary surface finish.

That last requirement is most difficult to achieve inasmuch as it demands a sheet glass production process capable of producing essentially finished glass sheet. Currently, the overflow downdraw sheet manufacturing process is employed. This process is described in U.S. Pat. No. 3,338,696 (Dockerty) and U.S. Pat. No. 3,682,609 (Dockerty). That process requires a glass exhibiting a very high viscosity at the liquidus temperature plus long term stability, e.g., periods of 30 days, against devitrification at melting and forming temperatures.

Corning Code 7059 glass, supra, is currently employed in the fabrication of LCDs. That glass, consisting essentially, in weight percent, of about 50% $SiO_2$, 15% $B_2O_3$, 10% $Al_2O_3$, and 24% BaO, is nominally free of alkali metal oxides, and exhibits a linear coefficient of thermal expansion, CTE, (25°–300° C.) of about $46 \times 10^{-7}$/°C. and a viscosity at the liquidus temperature in excess of 600,000 poises ($6 \times 10^4$ Pas). The high liquidus viscosity of the glass enables it to be drawn into sheet via the overflow downdraw sheet processing technique, but its relatively low strain point (~593° C.) is adequate only for processing a-Si devices and not for poly-Si devices.

Accordingly, extensive research has been directed at developing glasses designed to meet at least three general requirements. Initially, the glasses had to be adapted to use in fabricating poly-Si devices. Next, they had to be capable of being formed into sheet by the overflow downdraw process. Finally, they had to have linear CTEs that closely matched silicon.

The fruits of such research are reported, for example, in U.S. Pat. Nos. 4,409,337; 4,824,808; 5,116,787; 5,116,788; and 5,116,789, all issued in the name of W. H. Dumbaugh, Jr. The properties of these glasses, as well as their shortcomings, are reviewed in pending application Ser. No. 08/008,560 filed in the names of Dumbaugh, Jr. et al. and assigned to the assignee of the subject application.

A recent advance in liquid crystal technology termed "chip-on-glass" (COG) has further emphasized the need for the substrate glass to closely match silicon in thermal expansion. Thus, the initial LCD devices did not have their driver chips mounted on the substrate glass. Instead, the silicon chips were mounted remotely and were connected to the LCD substrate circuitry with compliant or flexible wiring. As LCD device technology improved and as the devices became larger, these flexible mountings became unacceptable, both because of cost and of uncertain reliability. This situation led to Tape Automatic Bonding (TAB) of the silicon chips. In that process the silicon chips and electrical connections to the chips were mounted on a carrier tape, that subassembly was mounted directly on the LCD substrate, and thereafter the connection to the LCD circuitry was completed. TAB decreased cost while improving reliability and increasing the permitted density of the conductors to a pitch of approximately 200 μm—all significant factors. COG, however, provides further improvement over TAB with respect to those three factors. Hence, as the size and quality requirements of LCD devices increase, COG is demanded for those devices dependent upon the use of integrated circuit silicon chips. For that reason, the substrate glass must demonstrate a linear coefficient of thermal expansion closely matching that of silicon; i.e., the glass must exhibit a linear coefficient of thermal expansion (0°–300° C.) between $32$–$46 \times 10^{-7}$/°C., most preferably $32$–$40 \times 10^{-7}$/°C.

The high viscosity value at the liquidus required for the overflow downdraw process, 600,000 poises (60,000 Pas), has been difficult to obtain in conjunction with the several other properties required for poly-Si devices. Consequently, attention has been given to other sheet-forming processes where the viscosity factor is not of such great significance. These include the float process and a redraw process.

The float process involves drawing a continuous sheet of glass over the surface of a molten metal, such as molten tin. The surface contacting the molten metal is not exposed during drawing, and hence is relatively smooth and free from defects. This has the virtue of requiring finishing of only one surface. It is a primary purpose of the present invention to provide glasses suitable for fabricating panels for poly-Si devices that can be drawn by the float process.

SUMMARY OF THE INVENTION

The present invention arose from the discovery of glasses in the barium aluminosilicate composition system which exhibit strain points higher than 650° C., CTEs in the range of $34$–$50 \times 10^{-7}$/°C., good chemical durability, exhibiting weight losses of less than 20 mg/cm$^2$ after immersion for 24 hours in an aqueous 5% by weight HCl solution at 95° C., and long term stability against devitrification at melting and forming temperatures. The glass compositions are essentially free from alkali metal oxides and consist essentially, expressed in terms of weight percent on the oxide basis, of 50–65% $SiO_2$, at least 8% $Al_2O_3$, the $Al_2O_3$ being 8–13% in conjunction with 55–65% $SiO_2$ and 18–22% in conjunction with 50–55% $SiO_2$, $SiO_2+Al_2O_3>68\%$, 0–8% $B_2O_3$, 2–21% BaO, 0–13% SRO, 0–18% CaO, 0–6% MgO and 13–30% BaO+CaO+SrO+MnO.

Compliance with those specified composition intervals has been found necessary in order to obtain glasses illustrating the desired matrix of chemical, forming, and physical properties, as is demonstrated below.

$SiO_2$ and $Al_2O_3$ are the glass-forming oxides. At least 50% $SiO_2$ and 8% $Al_2O_3$ are required for this purpose, as well as to provide the desired high strain point. Glass melting tends to become difficult with $SiO_2$ contents greater than 65% and $Al_2O_3$ contents greater than 22%.

$SiO_2$ and $Al_2O_3$ are also of concern with respect to glass durability. In this respect, however, the $SiO_2$ and $Al_2O_3$ contents are interdependent. Thus, with $Al_2O_3$ contents in the range of 8–13%, a $SiO_2$ content of at least 55%, and preferably at least 60%, is necessary to provide the required chemical durability. With an $Al_2O_3$ content in the range of 18–22%, the $SiO_2$ content may be as low as 50% while obtaining adequate durability. The total $SiO_2+Al_2O_3$ content should be greater than about 68% to achieve the desired durability.

$B_2O_3$ tends to soften the glass, that is, lower the melting temperature and facilitate melting. However, it lowers the strain point and is detrimental to durability, particularly in large amounts. Consequently, the $B_2O_3$ content should not exceed about 8%, and preferably is no more than 6%.

There are two considerations that dictate the required CTE values in the present glasses. Where silicon chips are to be mounted on the glass, a CTE of $32$–$40 \times 10^{-7}$/°C. is necessary, and a range of 36–40 is preferred. To this end, BaO content is preferably maintained low with other alkaline earth metal oxides and/or $Al_2O_3$ being substituted.

As noted earlier, the currently commercial glass is Code 7059. This glass has a CTE of about $46 \times 10^{-7}$/°C. Where compatibility with Code 7059 is desired, the present glasses desirably have a CTE in the range of $46$–$50 \times 10^{-7}$/°C. In general, the alkaline earth metals increase CTE in this order Ba>Sr>Ca>Mg with BaO having the greatest effect and MgO the least. Accordingly, a preferred set of compositions contains 5–18% CaO and 18–28% BaO+SrO+CaO.

In other aspects, the invention contemplates panels for LCD devices drawn from a glass as described above. It further contemplates a method of producing such panels by melting a glass as described and drawing sheet by such processes as the float process or a redrawing.

DESCRIPTION OF PREFERRED EMBODIMENTS

Table I reports a number of glass compositions. The compositions are expressed in terms of parts by weight on the oxide basis, illustrating the compositional parameters of the present inventive glasses. The sum of the individual components closely approximates 100, being slightly lower due to omission of a fining agent, such as $As_2O_3$. Hence, for all practical purposes, the listed values may be considered to reflect weight percent.

The actual batch materials may comprise the desired oxides. They may also comprise other compounds, which, when melted together with the other batch constituents, will be converted into the desired oxides in the proper proportions. For example, $CaCO_3$ and $BaCO_3$ can supply the source of CaO and BaO, respectively.

Glass batches based on these compositions were compounded. The batches were tumble mixed together thoroughly to assist in obtaining a homogeneous melt, and then charged into platinum crucibles. After placing lids thereon, the crucibles were introduced into furnaces operating at temperatures of 1650° C. To assure the formation of glasses free form inclusions and cords, a two-step melting practice was undertaken. The batch was first melted for about 16 hours and stirred. It was thereafter poured as a fine stream into a bath of tap water to form finely-divided particles of glass. This process is termed "drigaging" in the glass art. In the second step, the finely-divided glass particles (after drying) were remelted at 1650° C. for about four hours. The melts were stirred in both directions, i.e., both clockwise and counterclockwise. The melts were then poured onto steel plates to make glass slabs having the approximate dimensions 18"×6"×0.5" (~45.7×15.2×1.3 cm). Those slabs were then transferred immediately to an annealer operating at about 725° C.

It must be recognized that the above description reflects a laboratory melting procedure only. Thus, the inventive glasses are quite capable of being melted and formed utilizing large scale, commercial glass melting and forming equipment. Where desired, fining agents, such as the oxides of arsenic and antimony, may be added in customary amounts. The small residual remaining in the glass has no substantial effect upon the properties of the glass.

Table I also recites measurements of several chemical and physical properties determined on the glasses in accordance with measuring techniques conventional in the glass art. The linear coefficient of thermal expansion (CTE) over the temperature range 0°–300° C. is expressed in terms of $\times 10^{-7}/°C$. The softening point (S.P.), and the strain point (St.P) are expressed in terms of °C., and were determined via fiber elongation. The durability (Dur.) in HCl was evaluated by determining the weight loss ($mg/cm^2$) after immersion in a bath of aqueous 5% by weight HCl operating at 95° C. for 24 hours.

Comparisons also illustrate the effect of various oxide contents on durability. Thus, comparing compositions 11 and 12 indicates that substituting alkaline earth metal oxides has an enormous effect on durability. Also, comparing compositions 1 and 6 suggests the beneficial effect of omitting $B_2O_3$ in favor of alkaline earth metal oxides.

We claim:

1. A barium aluminosilicate glass exhibiting a strain point higher than 650° C., a weight loss less than 20 $mg/cm^2$ after immersion for 24 hours in an aqueous 5% by weight HCl solution at 95° C., a CTE between 34 and $50 \times 10^{-7}/°C$., nominally free of alkali metal oxides and having a composition consisting essentially of, as calculated in percent by weight on an oxide basis, 50–65% $SiO_2$, at least 8% $Al_2O_3$, the $Al_2O_3$ being 8–13% and CaO 0–7.1% in conjunction with 55–65% $SiO_2$ and the $Al_2O_3$ being 18–22% and CaO 0–18% in conjunction with 50–55% $SiO_2$, $SiO_2$+$Al_2O_3$>68%, 0–6% $B_2O_3$, 2–21% BaO, 0–13% SrO, 0–6% MgO and 13–20% BaO+CaO+SrO+MgO.

2. A glass in accordance with claim 1 having a CTE in the range of $36$–$40 \times 10^{-7}/°C$.

3. A glass in accordance with claim 1 having CTE in the range of $42$–$50 \times 10^{-7}/°C$.

4. A glass in accordance with claim 3 in which the composition includes 5–18% CaO and the BaO+CaO+SrO content is 18–28%, both by weight.

TABLE I

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 65 | 65.4 | 50.6 | 65 | 55.7 | 64.7 | 50.3 | 49.9 | 65.3 | 61.3 | 50.3 | 50.3 |
| $Al_2O_3$ | 8.2 | 13 | 22.1 | 8.1 | 13.6 | 8.0 | 20.1 | 21.8 | 8.0 | 17.9 | 21.5 | 21.7 |
| $B_2O_3$ | 7.8 | — | 6.0 | 5.8 | 5.1 | — | 0.6 | — | — | — | — | — |
| MgO | 3.1 | — | — | 0.3 | 3.0 | — | 0.6 | 5.9 | 5.9 | 0.2 | 5.8 | 3.1 |
| CaO | — | — | — | 18 | 7.1 | 5.7 | 6.4 | 0.3 | — | 17.5 | 0.6 | 9.2 |
| SrO | 13 | 0.4 | 12.8 | — | 5.2 | 12.9 | 0.4 | 0.5 | 12.6 | — | 0.4 | 13 |
| BaO | 2.2 | 20.7 | 8.2 | 2.2 | 9.3 | 7.7 | 20.9 | 20.5 | 7.0 | 2.0 | 20.2 | 2.2 |
| CTE | 38.6 | 38.9 | 41.3 | 48.5 | 46.8 | 49.4 | 48.7 | 43.5 | 44.9 | 48.3 | 43.6 | 51.3 |
| St.P. | 692 | 810 | 719 | 669 | 662 | 710 | 734 | 750 | 714 | 740 | 744 | 728 |
| S.P. | 1016 | 985 | 1003 | 1093 | 913 | 980 | 1008 | 1013 | 993 | 993 | 1012 | 972 |
| Dur. | 2.73 | 0.03 | 6.65 | 0.69 | 0.22 | 0.01 | 4.9 | 5.4 | 0.01 | 0.03 | 5 | 240 |

Table IA records the same glass compositions but reported in terms of mole percent on the oxide basis.

TABLE IA

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 72.43 | 80.18 | 63.56 | 68.05 | 64.03 | 75.05 | 63.65 | 62.03 | 73.34 | 61.56 | 62.46 | 56.70 |
| $Al_2O_3$ | 5.33 | 9.38 | 16.36 | 5.02 | 9.20 | 5.48 | 14.96 | 15.94 | 5.27 | 10.57 | 15.70 | 14.39 |
| $B_2O_3$ | 7.52 | 0.00 | 6.48 | 5.28 | 5.04 | 0.00 | 0.67 | 0.00 | 0.00 | 0.00 | 0.00 | 0.00 |
| MgO | 5.16 | 0.00 | 0.00 | 0.39 | 5.12 | 0.00 | 1.23 | 11.05 | 9.90 | 0.33 | 10.76 | 15.59 |
| CaO | 0.00 | 0.00 | 0.00 | 20.19 | 8.72 | 7.09 | 8.63 | 0.42 | 0.00 | 18.83 | 0.81 | 3.72 |
| SrO | 8.39 | 0.28 | 9.33 | 0.00 | 3.49 | 8.67 | 0.27 | 0.34 | 8.20 | 0.00 | 0.26 | 8.42 |
| BaO | 0.97 | 9.93 | 4.04 | 0.90 | 4.18 | 3.51 | 10.35 | 9.97 | 3.09 | 8.54 | 9.82 | 0.95 |

An examination of the above glasses illustrates the care in composition control that must be exercised in preparing glasses to provide the several properties that characterize the present invention. Thus, compositions 1, 4 and 9 are quite similar, except that 1 has a substantial SrO content, 4 has a substantial CaO content, and 9 omits $B_2O_3$ in favor of BaO. The consequence is a continuously higher strain point from 1 to 4 to 9, with 1 being marginally acceptable.

5. A glass in accordance with claim 1 having a weight loss of less than one $mg/cm^2$ after 24 hour immersion in 5% HCl solution at 95° C. and wherein the composition includes at least 55% $SiO_2$, $SiO_2$+$Al_2O_3$> 68% and 0–<6% $B_2O_3$, all by weight.

6. An LCD device comprising a barium aluminosilicate glass panel, the glass exhibiting a strain point higher than 650° C., a weight loss less than 20 $mg/cm^2$ after immersion for 24 hours in an aqueous 5% by weight HCl solution at 95° C., a CTE between 34 and $50 \times 10^{-7}/°C$., nominally free of alkali metal oxides and having a composition consisting essentially of, as calculated in percent by weight on an oxide basis, 50–65% $SiO_2$, at least 8% $Al_2O_3$, the $Al_2O_3$ being 8–13% and CaO 0–7.1% in conjunction with 55–65% $SiO_2$ and the $Al_2O_3$ being 18–22% and CaO 0–18% in conjunction with 50–55% $SiO_2$, $SiO_2+Al_2O_3>68\%$, 0–6% $B_2O_3$, 2–21% BaO, 0–13% SrO, 0–6% MgO and 13–30% BaO+CaO+SrO+MgO.

7. An LCD device in accordance with claim 6 wherein the glass panel has a CTE in the range of $42$–$50\times10^{-7}/°C$. and the composition includes 5–18% CaO and the BaO+CaO+SrO content is 18–28%, all by weight.

8. An LCD device in accordance with claim 6 wherein the glass panel has a weight loss of less than one $mg/cm^2$ after 24 hour immersion in 5% HCl solution at 95° C. and wherein the composition includes at least 55% $SiO_2$, $SiO_2+Al_2O_3>68\%$ and 0–<6% $B_2O_3$ all by weight.

9. A method of producing a glass panel for an LCD device which comprises melting a batch for a barium aluminosilicate glass consisting essentially of, as calculated in percent by weight on an oxide basis, 50–65% $SiO_2$ at least 8% $Al_2O_3$, the $Al_2O_3$ being 8–13% and CaO 0–7.1% in conjunction with 55–65% $SiO_2$ and the $Al_2O_3$ being 18–22% and CaO 0–18% in conjunction with 50–55% $SiO_2$, $SiO_2+Al_2O_3>68\%$, 0–6% $B_2O_3$, 2–21% BaO, 0–13% SrO, 0–6% MgO and 13–30% BaO+CaO, SrO+MgO, and drawing a thin sheet of molten glass for the melt.

10. A method in accordance with claim 9 wherein the glass sheet is drawn by the float process.

* * * * *